(12) United States Patent
Stevenson

(10) Patent No.: US 6,646,771 B2
(45) Date of Patent: Nov. 11, 2003

(54) METHOD FOR PRODUCING HOLOGRAPHIC OPTICAL ELEMENT COMPRISING PRIMARY AND COMPLEMENTARY HOLOGRAMS AND ASSOCIATED METHODS FOR ESTABLISHING AUTHENTICITY OF ELEMENT USED AS SECURITY DEVICE

(75) Inventor: Sylvia H Stevenson, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/741,944

(22) Filed: Dec. 21, 2000

(65) Prior Publication Data

US 2002/0118409 A1 Aug. 29, 2002

(51) Int. Cl.[7] .............................. G03H 1/00; G03H 1/20; G03H 1/22
(52) U.S. Cl. ................................ 359/2; 359/12; 359/24; 359/32; 359/33; 430/1
(58) Field of Search ........................ 359/1, 2, 12, 22, 359/24, 32; 430/1; 283/86

(56) References Cited

U.S. PATENT DOCUMENTS

| | | |
|---|---|---|
| 4,895,419 A | 1/1990 | Doyle et al. |
| 4,933,120 A | 6/1990 | D'Amato et al. |
| 5,003,915 A | 4/1991 | D'Amato et al. |
| 5,059,499 A | 10/1991 | Teitel |
| 5,083,850 A | 1/1992 | Mallik et al. |
| 5,116,548 A | 5/1992 | Mallik et al. |
| 5,145,212 A | * 9/1992 | Mallik .............................. 359/2 |
| 5,696,613 A | * 12/1997 | Redfield et al. ............... 359/24 |
| 5,781,317 A | * 7/1998 | Kawazoe et al. ............. 359/12 |
| 5,798,850 A | 8/1998 | Ishikawa et al. |
| 5,812,287 A | * 9/1998 | Vivarelli ......................... 359/2 |
| 5,825,514 A | 10/1998 | Dausmann et al. |

FOREIGN PATENT DOCUMENTS

| | | |
|---|---|---|
| EP | 0472051 | 2/1992 |
| EP | 0753801 | 1/1997 |
| JP | 5-46063 | 2/1993 |
| JP | 5-281894 | 10/1993 |
| WO | WO 98/41904 | 9/1998 |

OTHER PUBLICATIONS

Disclosed Anonymously, Apparatus and Method for Replicating Holograms in a Recording Film, Research Disclosure 40402, Dec. 1997, 851–853.

* cited by examiner

Primary Examiner—Andrey Chang
(74) Attorney, Agent, or Firm—Thomas H. Magee

(57) ABSTRACT

A method is provided for producing a holographic optical element that is comprised of at least one primary hologram (as defined herein) and at least one complementary hologram (as defined herein). The holographic optical element is useful as a security device, since it is relatively easily produced and yet is uncopyable in total. Also disclosed are methods for establishing the authenticity of the holographic optical element.

12 Claims, 4 Drawing Sheets

METHOD FOR PRODUCING HOLOGRAPHIC OPTICAL ELEMENT COMPRISING PRIMARY AND COMPLEMENTARY HOLOGRAMS AND ASSOCIATED METHODS FOR ESTABLISHING AUTHENTICITY OF ELEMENT USED AS SECURITY DEVICE

BACKGROUND OF THE INVENTION

1. Field of the Invention

This invention pertains to a method for producing a holographic optical element (HOE) that is comprised of a primary hologram (as defined herein) and a complementary hologram (as defined herein). The element is especially useful as a security device. The invention also pertains to methods for establishing the authenticity of the HOE when used as a security hologram as well as the HOE itself.

2. Description of Related Art

A contact copy of a typical hologram, e.g., a master hologram, can be made in a volume photosensitive recording material, such as a photopolymer holographic recording film (HRF), by placing the HRF either in contact with or optically coupled to the primary hologram in such a way that a beam of coherent light illuminates the hologram, causing an image to play back and illuminate the HRF acting as an object wave. At the same time, the beam of coherent light illuminates the recording film to act as a reference wave. Interaction of the object and reference waves produces an interference pattern that is recorded in the HRF to produce the contact copy of the master hologram. FIG. 1 shows contact copying of a reflection hologram where the object wave is designated as SIG and the reference wave is designated as REF. In contact copying a reflection hologram, the beam of coherent light first strikes the HRF (1) and then the master hologram (5) (original, to be copied), causing playback from the master hologram to strike the HRF in the same region and thus generate an interference pattern which results in the hologram being recorded in the HRF. Contact copying includes both rigorous contact copying, where the distance between hologram (5) and recording medium (1) is zero, and "near-contact" copying, where the distance between hologram (5) and recording medium (1) is small, generally a centimeter or less. Such contact copying is well known in the art and is documented in references such as "Hologram Copying", by William T. Rhodes, or *The Holography Handbook,* edited by H. J. Caufield, Academic Press (1979), pages 373–8.

Holograms are useful in security applications such as, for example, providing a way of establishing authenticity of documents and/or other significant articles, such as credit cards. Use of holograms in security applications is attractive since holographic imaging is not widely known nor easily practiced by would-be counterfeiters and also because it can easily provide a pleasing, aesthetically interesting image. However, because contact copying can be employed to copy any master hologram, these holograms have limited use in security applications and may be subject to counterfeiting. A method of counterfeiting holograms is to use a valid hologram as a master and to use holographic contact copying techniques to make counterfeit holograms which are copies of the valid hologram (master) but which appear to be valid, since the copied counterfeit holograms are indistinguishable or nearly indistinguishable from the master. There is a need in security applications for holographic elements and associated processes for producing these elements that cannot be copied. The present invention provides a solution to this critical need.

SUMMARY OF THE INVENTION

This invention provides a method for producing a holographic optical element (HOE) comprised of at least one primary hologram and at least one complementary hologram, such that the holographic optical element is not copyable in total and which consequently cannot be counterfeited using holographic techniques presently known to the art. This invention also provides the holographic optical element, which is useful especially for security applications. It also provides methods for validating the authenticity of the holographic optical element of this invention.

In one embodiment, the invention is a method for producing a holographic optical element useful as a security device comprising:

(a) placing a photosensitive layer adjacent to a surface-relief hologram in a manner such that the photosensitive layer and the surface-relief hologram are in a relationship selected from the group consisting of 1) direct contact and 2) separated by one or more media with each medium having refractive index greater than 1;

(b) exposing the photosensitive layer and the surface-relief hologram to a coherent light beam to record the surface-relief hologram in the photosensitive layer as reflection holograms comprising at least one primary hologram and at least one complementary hologram; and (c) separating the surface-relief hologram from the imaged photosensitive layer to obtain the volume holographic optical element.

In another embodiment, the invention is a method for establishing the authenticity of the inventive holographic optical element comprising the steps of:

(a) illuminating the holographic optical element with white light at an angle θ measured with respect to a normal line to a surface of the holographic optical element and simultaneously viewing the holographic optical element along the normal line to thereby see a holographic image having a first color, wherein |θ| is approximately in the range of 15 degrees to 55 degrees;

(b) illuminating the holographic optical element with white light at approximately an angle δ=−θ±15° (angle δ equals minus θ plus or minus 15°) measured with respect to a normal line to the surface of the holographic optical element and simultaneously viewing the holographic optical element along the normal line to ascertain if a holographic image is observed having a second color that is characteristic of a wavelength that is longer than that for the first color; and (c) establishing the holographic optical element to be authentic only if a holographic image of the first color is observed in step (a) and a holographic image of the second color is observed in step (b).

In another embodiment, the invention is another method for establishing the authenticity of the inventive holographic optical element comprising the steps of:

(a) illuminating a first surface of the holographic optical element with white light at an angle θ measured with respect to a normal line to a center plane of the holographic optical element and simultaneously viewing the first surface of the holographic optical element along the normal line to thereby see a holographic image having a first color, wherein |θ| is approximately in the range of 15 to 55 degrees (°);

(b) rotating the holographic optical element 180° about an axis in the center plane of the holographic optical element with continued illumination such that illumination from step (a) is now incident upon a second surface, and simultaneously viewing the second surface of the holographic optical element along the normal line to ascertain if a holographic image is observed having a second color that is characteristic of a wavelength that is longer than that for the first color; and (c) establishing the holographic optical element to be authentic only if a holographic image of the first color is observed in step (a) and a holographic image of the second color is observed in step (b).

The first surface is the side of the holographic optical element from which imaging by exposure to a coherent light source was done, and the second surface is the side opposite to the first surface (side opposite to the side nearest the coherent light source).

In the aforementioned embodiments for authenticating a hologram, it is also possible to illuminate the HOE with white light at 0° (along a normal line) and to observe the hologram to ascertain its color along an angle that is not along the normal line.

DETAILED DESCRIPTION OF THE PREFERRED EMOBIDMENT(S)

A complementary hologram is formed under certain conditions when making a volume reflection hologram by copying from a surface-relief hologram ("embossed master") into the volume medium via a contact copying process. The contact copying process can either be accomplished by laminating the volume medium directly to the surface-relief hologram, or by coupling the volume medium to the surface-relief hologram via a coupling fluid with refractive index substantially greater than 1.

Figure 1:
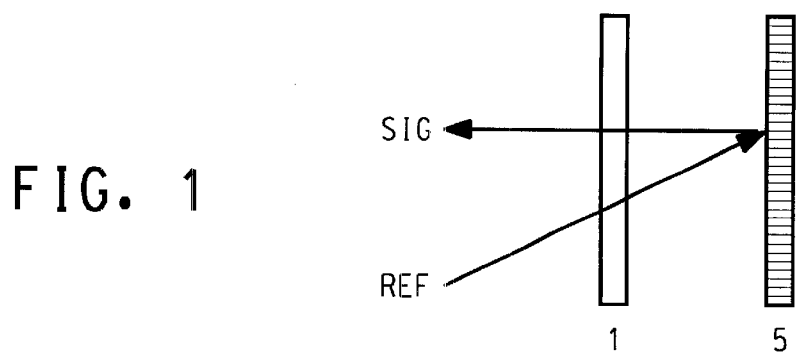
FIG. 1 illustrates some basic features of contact copying of a reflection hologram, where the object wave is designated as SIG and the reference wave is designated as REF.
Figure 2:
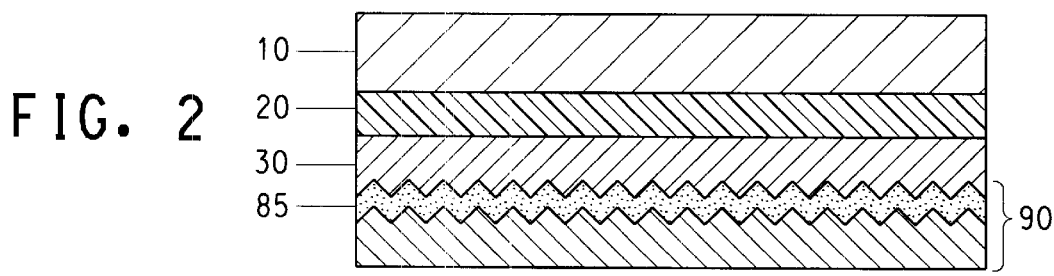
FIG. 2 illustrates a typical copying stack that has a coupling medium 30 (e.g., coupling fluid) present to optically couple recording medium 20 (e.g., HRF) to surface-relief hologram 90.

An example of a copying stack having a coupling medium is shown in FIG. 2. In FIG. 2, the copying stack illustrated consists of in order a recording medium substrate (10), a recording medium (20) (e.g., a photopolymer layer of HRF), a coupling medium (30), and a surface-relief (optionally metallized) hologram (90). As shown in FIG. 2, the surface relief hologram 90 is comprised of an optional metallized layer 85. It is not necessary to orient the surface-relief master hologram "surface-relief-side-up"; both the "surface-relief-side-up" and "surface-relief-side-down" orientations are feasible to employ and specific circumstances for individual situations can dictate the better choice. The "surface-relief-side-up" orientation is shown in FIG. 2.

It is not absolutely necessary to use a surface-relief hologram which has been metallized, but metallization of the surface relief hologram improves the efficiency and is normally used in most label and other applications. As illustrated in FIG. 2, surface relief hologram 90 has a metallized layer 85. Metallization of surface relief holograms can be done with, but is not limited to, the following metals: silver and aluminum. Metallization of a surface-relief hologram can be either on the surface relief side of the hologram or on the underside (other side), but it is preferably done on the relief side. Without signal enhancement that results from metallization, a surface-relief hologram will still exhibit a reflected signal upon illumination, but this reflected signal will be weak. Without metallization, the strong signal will be a transmitted diffracted signal.

The coupling medium may be more than one layer, and may consist of two or more layers of liquid or other intimately contacted media with similar but not necessarily identical refractive indices, all of which are similar but not necessarily identical to that of the recording material. Such media may be, but are not limited to, borosilicate glass, xylene, and Isopar® solvents (manufactured by Exxon Corporation).

When a surface of a surface-relief hologram characterized by a grating is illuminated by a source illumination, several diffracted signal beams may be generated. Each diffracted beam will obey the grating equation relationship $$\sin(\theta_c) = (m\lambda_c/d) - \sin(i_c), \tag{1}$$

where
- $\lambda_c$ is the wavelength of the source illumination,
- d is the spacing of the surface-relief grating,
- $i_c$ is the angle of the source illumination, measured in reference to a normal to the surface of the surface-relief hologram,
- m is an integer, and
- $\theta_c$ is the angle of the signal beam, measured with respect to the normal to the surface of the surface-relief hologram. ($\theta_c$ is illustrated in FIG. 3 for the m=1 diffracted beam.)

The grating equation is discussed in various references, such as, for example, Optics and Lasers, Second Edition, by Matt Young, Springer-Verlag, New York (1984).

An illustration of Eq. (1) is shown in FIG. 3, where a typical grating spacing value of d=1000 nm and $\lambda_c$=514 nm has been used to compute output (i.e., diffracted or reflected beams from a source beam) which provides a beam 50 that is incident at $i_c$=45° on a surface-relief hologram 90. Beam 70 is a reflected and undiffracted ray corresponding to m=0. Beam 60 is a diffracted beam corresponding to m=1. Beam 80 is a diffracted beam corresponding to m=3. Diffracted beams where m<0 or where m>3 are forbidden. In Eq. (1) and in FIG. 3 (as well as other figures), the signs of the beam angles are positive for angles measured clockwise from the film normal 100, and negative for angles measured counterclockwise from the film normal 100, irrespective of orientation sense (i.e., pointed towards or away from HRF sample) of the beam. Specifically for FIG. 3, the angle of source illumination ($i_c$) as drawn is positive, since the source beam is observed to be clockwise with respect to the normal 100. Also for FIG. 3 as drawn, the angle of the signal beam ($\theta_c$) is negative, since the signal beam is observed to be counterclockwise with respect to the normal line 100 (dotted line in FIG. 3).

Figure 3:
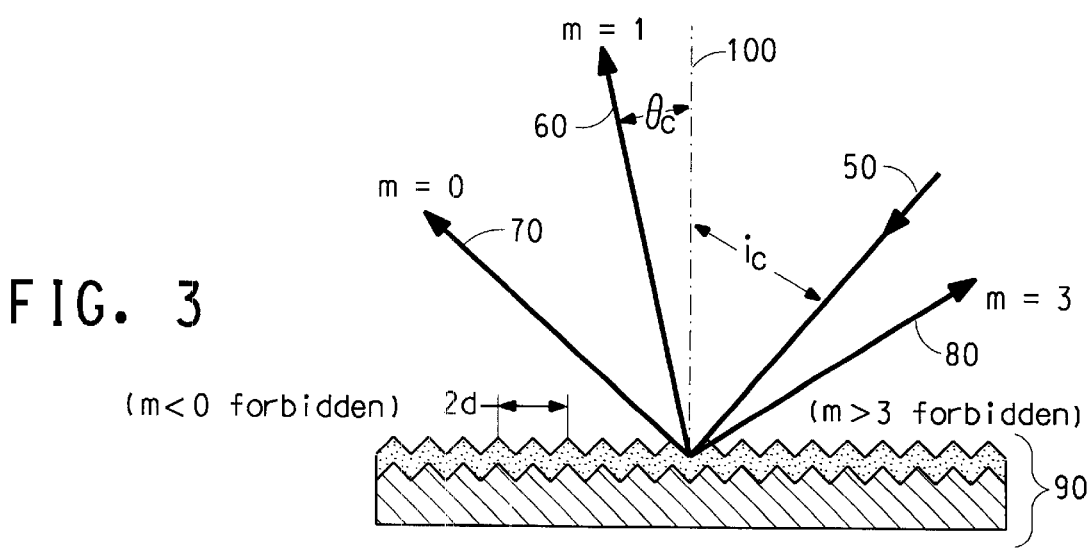
FIG. 3 illustrates playback in air from a surface-relief hologram (90) for illustrative, but typical values of the grating spacing (d=1000 nm) and wavelength of the source illumination ($\lambda_c$=514 nm). (Rays are shown only for odd and zero orders of diffraction.)

In this example as illustrated in FIG. 3, it has further been assumed that the surface relief grating features are symmetric (which is typical), so that only odd orders of signal occur. (This follows from known relationships of orders, diffraction pattern intensities, and grating features, which are well documented in various references, as in, for example, *Optics and Lasers*, Second Edition, by Matt Young, Springer-Verlag, New York (1984).) In general, however, even orders are also allowed. The "0" order is always allowed and represents the undiffracted portion of the beam. In using Eq. (1) to compute values of $\theta_c$, one is restricted to using those values of m which do not produce the forbidden condition $|\sin(\theta_c)|>1$. Equation (1) may be rearranged to determine which angles of beam incidence, $i_c$, can produce an output signal with a given diffraction order m. This affords the requirement (2) as shown below, which is defined to be "Criterion A" and is sufficient for the existence of a signal of diffraction order m in air.

$$(1+m\lambda_c/d) \geq \sin(i_c) \geq (m\lambda_c/d-1) \quad (2)$$

The situation is different when the signal beams from the surface relief holograms are diffracted into a medium with an index of refraction, n, other than 1. In this case, Eq. (1) becomes Eq. (3) as shown below.

$$\sin(\theta_c') = m\lambda_c/nd - \sin(i_c'), \quad (3)$$

where $\theta_c'$ and $i_c'$ are the values of the angles in the medium, which may be expressed according to Snell's Law as sin($\theta_c'$)=sin($\theta_c$)/n and sin($i_c'$)=sin($i_c$)/n, using the conventions given in FIG. 3. Snell's Law is well known in the art and is documented in references such as *Principles of Optics*, by Max Born and Emil Wolf, Pergamon Press, $6^{th}$ ed. 1980. Now the criterion for existence of a given diffraction order becomes $|\sin(\theta_c)/n| \leq 1$, or $$(n+m\lambda_c/d) \geq \sin(i_c) \geq (m\lambda_c/d-n) \quad (4)$$

The above requirement designated (4) is defined to be "Criterion B" and is sufficient for the existence of a signal of diffraction order m both in the medium of index n and in air.

Figure 4:
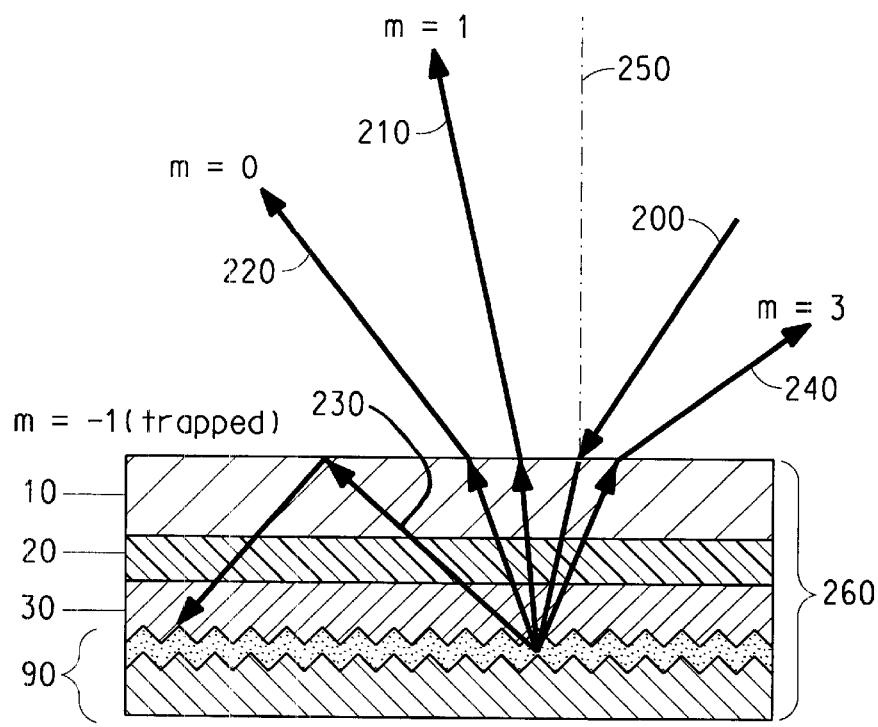
FIG. 4 illustrates playback in a photopolymer medium (e.g., HRF, having refractive index of approximately 1.5) from a surface-relief hologram (90).

An example of this situation is the case where the incident beam originates above the stack of FIG. 2 onto the surface-relief master (e.g., embossed master) of FIG. 3. This situation is illustrated in FIG. 4. In FIG. 4, source beam 200 is incident upon the stack 260 where it is first refracted in the recording medium substrate 10. After traversing substrate 10, it subsequently traverses in order the recording medium 20, the coupling medium 30, and then is incident upon the surface-relief hologram 90, where the beam is either reflected or diffracted. Beam 220 is the m=0 reflected beam. Beam 210 is the m=+1 diffracted beam. Beam 230 is the m=−1 diffracted beam, which, while trapped, nevertheless is a signal beam which traverses the recording medium and records a hologram corresponding to m=−1. Beam 240 is the m=3 diffracted beam. Dotted line 250 is a normal to the stack 260.

In this case as illustrated in FIG. 4, Criterion B describes the signal beams which will reach the recording medium and contribute to the recording of the volume hologram. (It is specified that the value of n in Equation (4) is the lesser of the refractive indices of the coupling medium and of the recording medium.) For each signal beam, the volume medium will record the interference between that signal beam and the incoming source (reference) beam. Since the contrast in the interference pattern determines the efficiency of the hologram, a coherent source such as a laser is a practical choice for recording these holograms.

As illustrated in FIG. 4, some of the signal beams which record gratings in the volume recording medium are the same orders as those shown in FIG. 3. These are the diffraction orders which satisfy both Criterion A and Criterion B. They record holograms which in white light will play back at approximately the laser wavelength at an angle similar to or nearer the film normal than the diffraction angle, when illuminated at the incident exposure angle. These holograms (excluding the trivial m=0 order) are defined to be primary holograms. (Playback wavelength will in fact vary somewhat with illumination angle. In fact, if, for example a surface-relief hologram plays back at normal when illuminated at a certain illumination (design) angle, then if it is copied using an illumination angle closer to normal than the design angle the playback in the copy will be a little bluer than the laser wavelength and if it is copied using an illumination angle that is further from normal than the design angle the playback in the copy will be a little redder.)

Other beams, e.g. beam 230 as illustrated in FIG. 4, are possible, satisfying Criterion B but not Criterion A. These beams will still reach the recording medium to record holograms. These holograms will be produced from a signal beam which cannot exist in air, and therefore the grating which is formed will have a spacing and orientation which may or may not produce a viewable playback in white light. When such a playback is produced, it is defined herein to be a complementary hologram.

Commonly, surface relief holograms are designed so that they only produce m=0 and only one m=|1| order signal beams in air when illuminated at a convenient reading angle. Copies of these holograms have only one primary hologram, the one m=|1| order. (The one m=1| order can either be m=+1 or it can be m=−1, but it cannot be both.) The dominant complementary hologram produced by a given surface-relief master hologram is the m=−1 order when the primary hologram is the m=+1 order and is the m=+1 order when the primary hologram is the m=−1 order. This dominant complementary hologram is generally viewed in white light by illuminating the hologram in a sense opposite to that which plays back the primary hologram, but is incident upon the same surface of the hologram. Depth information (e.g., whether an image of the hologram appears to an observer to be inside the volume recording material or outside (in front of) the volume recording material) in the complementary hologram is inverted with respect to the primary hologram when illuminated in this manner, and the complementary hologram plays back at a wavelength which is typically greater than that of the primary hologram.

The holographic reference and signal waves in a volume grating obey the vector relation $$\vec{k}_S = \vec{k}_R - \vec{K}$$

where $\vec{k}_S$ and $\vec{k}_R$ are the propagation wave vectors of the signal and reference waves, respectively; and $\vec{K}$ is the characteristic grating vector. Wave vectors $\vec{k}_s$ and $\vec{k}_R$ have magnitudes of $2\pi n/\lambda$ and are parallel to the propagation direction of the signal and reference waves, respectively. The grating vector $\vec{K}$ has a magnitude $2\pi/\Lambda$, where $\Lambda$ is the characteristic spacing of the volume grating features, referred to as "planes" for simplicity. $\vec{K}$ is oriented in a direction normal to the orientation of the grating planes. The above vector relationship is known as the Bragg condition and is well known in the art. It is described in H. Kogelnik, "Coupled Wave Theory for Thick Hologram Gratings", The Bell System Technical Journal, Vol. 48(9), 1969, pp. 2909–48.

Figure 5:
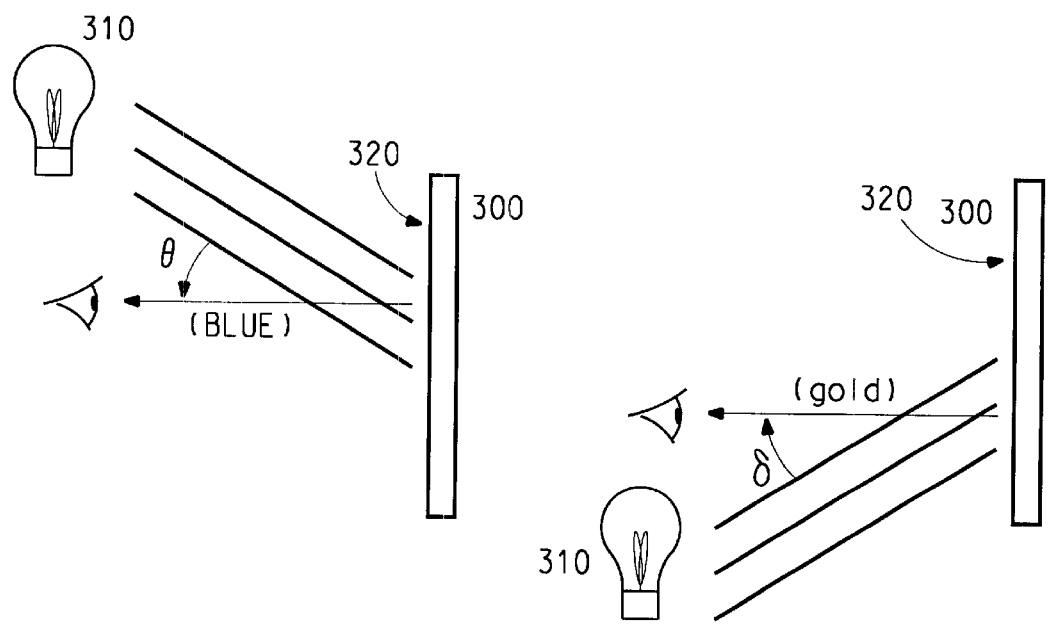
FIG. 5 illustrates two holograms of different colors seen by an observer when the incident angle of a white-light beam is changed (blue for angle θ and gold for angle δ as shown in this figure). Observation of these different colored holograms is one of the methods for establishing authenticity of the holographic optical element of this invention.

In relation to discussion presented infra, white light viewing conditions for a volume reflection hologram are defined herein to be the following standardized conditions: The hologram is viewed in air. The viewing angle is fixed at 0° (i.e., viewing along a normal line as illustrated, for example, in FIG. 5), with illumination angle and observed color determined by Bragg conditions for the volume reflection hologram and more specifically for a grating of the volume reflection hologram. It is to be understood that each signal beam only results in one hologram being recorded. Not every incident angle choice will result in recording of a complementary hologram when copying a given surface relief hologram, and not every complementary hologram which is recorded is possible to view in white light. In making a contact volume copy of a surface relief hologram, for a given diffracted order from that hologram four cases can be defined:

Case I) The signal beam meets both Criteria. A primary hologram is recorded.

Case II) The signal beam meets Criterion B only. A complementary hologram is produced which satisfies a Bragg condition in white light at a wavelength and angle such that the hologram is viewable.

Case III) The signal beam meets Criterion B only. A complementary hologram is produced which satisfies the Bragg condition for white light viewing at a wavelength <450 nm or >700 nm, or requires an illumination angle between −5° and +5°. The hologram is not viewable, since in case of the former, the wavelength is outside the visible range, and, in case of the latter, the illumination and viewing angles are approximately the same.

Case IV) The signal beam meets Criterion B only. No hologram with white-light Bragg viewing conditions is recorded.

Algebraic Formulation

It is possible to derive algebraic expressions for the exposure angles which will produce Cases I–IV holograms from a given surface relief hologram ("embossed master"). These expressions are summarized in Table 1 at the end of this section.

A necessary condition for any of Cases I–IV is satisfaction of Criterion B. If, in addition, Criterion A is satisfied, the hologram falls under Case I primary hologram).

The above equation can be rewritten as the relations given below (Equations 5a) and 5b).

Algebraic expressions describing Cases II, III, and IV have been derived as shown below. A volume grating obeys the relations $$-\sin(\theta_c') = \sin(i_c') - \lambda_c \sin(\phi)/(n_f \Lambda) \qquad (5a)$$

and $$-\cos(\theta_c') = \cos(i_c') - \lambda_c \cos(\phi)/(n_f \Lambda), \qquad (5b)$$

where $i_c'$ and $\theta_c'$ are the angles of two beams of wavelength (in air) $\lambda_c$ inside a recording medium of index $n_f$. (Note that in this case the refractive index is specifically that of the recording medium only.) The quantities $\phi$ and $\Lambda$ describe a characteristic slant angle and spacing, respectively, of the interference grating which is recorded to form the volume hologram.

In the case of the contact copy of an embossed master, the angle $i_c'$ describes the incident beam, and the angle $\theta_c'$ describes any signal beam from the embossed master which satisfies Criterion B:

$$i_c' = \sin^{-1}\{\sin(i_c)/n_f\} \qquad (6a)$$

and $$\theta_c' = \sin^{-1}\{m\lambda_c/(n_f d) - \sin(i_c')\}, \qquad (6b)$$

where d is the surface relief grating spacing and $n_f$ is the refractive index of the volume recording film.

Equations (5) and (6) solve to $$\Lambda = (\lambda_c/n_f)\{2+2\cos(i_c'-\theta_c')\}^{-1/2} \qquad (7a)$$

and $$\phi = \sin^{-1}\{[\sin(i_c')+\sin(\theta_c')][2+2\cos(i_c'-\theta_c')]^{-1/2}\} \qquad (7b)$$

This hologram is viewed at 0° at an incident angle $\theta_i$ and wavelength $\lambda$ according to $$\sin(\theta_i) - \lambda \sin(\phi)/\Lambda = 0 \quad (8a)$$

and $$-n_r = \{n_r^2 - \sin^2(\theta_i)\}^{1/2} - \lambda \cos(\phi)/\Lambda \quad (8b)$$

which solve to $$\lambda = 2n_r \Lambda \cos(\phi) \quad (9a)$$

and $$\theta_{i=\sin}^{-1}\{2n_r \sin(\phi)\cos(\phi)\}. \quad (9b)$$

Here $n_r$ is the refractive index of the volume recording medium after processing.

This playback is forbidden (Case IV) if $|2 n_r \sin(\phi)\cos(\phi)| > 1$. A necessary condition for Cases II and III is $|2 n_r \sin(\phi)\cos(\phi)| \leq 1$. Case II holograms in addition satisfy the criteria $$450 \; nm \leq 2n_r \Lambda \cos(\phi) \leq 700 \; nm \text{ and } |\sin^{-1}\{2n_r \sin(\phi)\cos(\phi)\}| > 5°.$$

These expressions are summarized in Table 1.

TABLE 1

Categories of volume reflection holograms resulting from diffracted signals from a surface relief grating contact-copied into a volume recording medium

| Case | Criteria | Additional Requirements |
|---|---|---|
| I. Primary hologram | A and B | None |
| II. Viewable complementary hologram | B only | $\|2 n_r \sin(\phi)\cos(\phi)\| \leq 1$ <br> $450 \; nm \leq 2 n_r \Lambda \cos(\phi) \leq 700 \; nm$ <br> $\|\sin^{-1}\{2 n_r \sin(\phi)\cos(\phi)\}\| > 5°$ |
| III. Non-viewable complementary hologram | B only | $\|2 n_r \sin(\phi)\cos(\phi)\| \leq 1$ <br> $\|2 n_r \sin(\phi)\cos(\phi)\| > 1$ and <br> $\|\sin^{-1}\{2 n_r \sin(\phi)\cos(\phi)\}\| > 5°$ or <br> $2 n_r \Lambda \cos(\phi) > 700 \; nm$ or <br> $2 n_r \Lambda \cos(\phi) < 450 \; nm$ |
| IV. Complementary hologram with forbidden playback | B only | $\|2 n_r \sin(\phi)\cos(\phi)\| > 1$ |

$n_r$ = refractive index of exposed, processed recording medium $\phi$ = slant angle of recorded volume grating = $\sin^{-1}\{[\sin(i_c') + \sin(\theta_c')][2+2\cos(i_c'-\theta_c')]^{-1/2}\}$ $\Lambda$ = spacing of recorded volume grating = $(\lambda_c/n_f)\{2+2\cos(i_c'-\theta_c')\}^{-1/2}$ $i_c'$ = incident exposure beam angle in the recording medium = $\sin^{-1}\{\sin(i_c)/n_f\}$ $i_c$ = incident exposure beam angle in air (i.e. outside the stack)

$i_c'$ = diffracted signal beam angle in the recording medium = $\sin^{-1}\{m \lambda_c/(n_f d) - \sin(i_c')\}$ $n_f$ = refractive index of the recording medium during exposure d = spacing of the surface relief grating $\lambda_c$ = wavelength of the exposure beam m = diffraction order of the signal beam.

Criterion A is $(1+m \lambda_c/d) \geq \sin(i_c) \geq (m \lambda_c/d - 1)$.

Criterion B is $(n+m \lambda_c/d) \geq \sin(i_c) \geq (m \lambda_c/d - n)$, where n is the lowest refractive index the diffracted beam encounters on its way from the surface relief hologram through the recording medium during the contact copy process.

(For definitions of $\phi$ and $\Lambda$, see H. Kogelnik, "Coupled Wave Theory for Thick Hologram Gratings", The Bell System Technical Journal, Vol. 48(9), 1969, pp. 2909–48.)

Numerical Examples

The range of angles which produce complementary holograms varies with grating spacing d of the embossed master. Typical values for d are dictated by the requirement for the surface relief holograms to be viewed at 0° with a convenient illumination angle such as any angle in the range $20° \leq i_c \leq 60°$, with $30° \leq i_c \leq 45°$ the most commonly used portion of this range. The m=1 signal is designed to be near $\theta_c = 0°$. Such holograms have spacings d in the range of approximately 700–1500 nm, with 1000 nm being typical. Larger spacings are generally avoided in order to restrict the playback to one order only.

Table 2 gives the incident angle ranges for recording the m=−1 order complementary hologram from a typical embossed hologram.

TABLE 2

Incident angle ranges for contact-copying the m = −1 order volume reflection complementary hologram from an embossed hologram with a grating spacing d = 1000 nm, for typical laser exposure wavelengths

| exposure wavelength (nm) | Case I | Case II | Case III | Case IV |
|---|---|---|---|---|
| 476 | $\leq 31°$ | 32°–57° | $\geq 58°$ | none |
| 514 | $\leq 29°$ | 30°–48° | 49°–80° | $\geq 81°$ |
| 532 | $\leq 27°$ | 28°–43° | 44°–74° | $\geq 75°$ |
| 633 | $\leq 21°$ | none | 22°–55° | $\geq 56°$ |

Ranges appropriate for Case II are a stronger function of surface relief grating spacing d than of exposure wavelength $\lambda$. Table 3 gives examples.

TABLE 3

Incident angle ranges for contact-copying the m = −1 order volume reflection complementary hologram from an embossed hologram at 514 nm to form a Case II complementary hologram.

| d (nm) | incident angle range |
|---|---|
| 700 | 16°–39° |
| 800 | 21°–42° |
| 900 | 26°–46° |
| 1000 | 30°–48° |
| 1100 | 33°–50° |
| 1200 | 35°–51° |
| 1300 | 38°–53° |
| 1400 | 40°–54° |
| 1500 | 42°–55° |

Color Tuning

Color tuning using a tuning film can be utilized to adjust the playback wavelength of holograms present in the imaged HRFs of this invention. Color tuning of holograms is described in Smothers et al., U.S. Pat. No. 4,959,283; Smothers et al., U.S. Pat. No. 5,024,909; and Gambogi et al., U.S. Pat. No. 5,182,180. Color tuning involves laminating an imaged HRF to a color tuning film and heating the laminate for a specified time and temperature to effect diffusion of component(s) from the color tuning film to the imaged HRF, which results in a change in playback wavelength. When color tuning is utilized, it is done after UV exposure and prior to baking (e.g., in a scroll oven). See Example 1 for details of typical conditions for UV exposure and baking in a scroll oven.

EXAMPLE 1

In this example, a metallized surface relief hologram of approximate dimensions 5"×7" was used as a master hologram. The hologram was designed to play out at about ±31° from the direction normal to the hologram plane (the "film normal") when illuminated with light of wavelength 476 nm at normal incidence. The grating spacing d of this metallized surface relief hologram was approximately 925 nm.

A sheet of approximate dimensions 5"×7" of DuPont OmniDex® 706 holographic recording film (HRF, source: E. I. du Pont de Nemours and Company, Wilmington, Del.) was used for this recording. This film is sensitive to blue and green actinic radiation and consists of a polyester film base, a photopolymer layer, and a protective cover sheet. It shrinks slightly on processing. Under dim red safelights, the protective cover sheet was removed from the HRF sheet, and the HRF sheet (without its cover sheet) was laminated to the metallized side of the master hologram. The resulting laminate structure was as follows: master hologram/photopolymer layer/polyester film base.

The laminate was placed flat on an optical table, master-side-down. The corners were taped to the table to provide stability and to insure flatness. After a settling period of 30 seconds, the laminate was illuminated with a collimated beam of s-polarized 476 nm light from an argon ion laser, incident from a direction above the table and 30° from the film normal. The total exposure energy was 50 mJ/cm$^2$.

After the above laser exposure, the laminate was exposed from the photopolymer layer/polyester film base side with UV "A" radiation (UV "A" radiation is defined to be ultraviolet light of wavelength 315–400 nm in Light Measurement Handbook, by Alex Ryer, International Light, Inc., Newburyport, Mass. (1997).), for a total exposure of 100 mJ/cm$^2$, and then baked in an OmniDex® Scroll Oven (E. I. du Pont de Nemours and Company, Wilmington, Del.) at 140° C. for 8 minutes to afford an imaged HRF. (For baking in the Scroll Oven, the laminate was fastened, using PET-based adhesive tape, to a Mylar® PET web which then moved in festoon fashion through the Scroll Oven, which is a forced-air oven, during baking.)

After baking the laminate as specified above, the master was removed from the imaged HRF at the photopolymer layer and the photopolymer layer was laminated to one side of a double-faced clear pressure-sensitive adhesive (Mactac IP2100, Morgan Adhesives Co., Stow, Ohio.). A piece of Cronar® black PET (E. I. du Pont de Nemours, Wilmington, Del.) was laminated to the other side of the double-sided adhesive. (This treatment was done to destroy any surface relief pattern, if present at this point, in the exposed/cured holographic recording film. Any holograms observable following this treatment are volume holograms, not surface relief holograms.) The resulting imaged HRF sample was trimmed to the size of the viewing area, about 3"×5".

When illuminated with broadband white light from a broadband white light source that was incident on a surface of one side (i.e., light incident on polyester film base of HRF on same side on which laser imaging was done) of the imaged HRF sample, the imaged HRF sample displayed a copy of the original surface relief hologram upon illumination at approximately the recording angle. The observed hologram was blue when viewed normal or approximately normal to the plane of the imaged HRF sample (as shown schematically in FIG. 6(a) without separate layers being shown, where 400 is the imaged HRF. 410 is a surface of one side of the imaged HRF, and 405 is the broadband white light source. In FIGS. 6(a), 6(b) and 6(c), 415 represents any given portion of the imaged HRF 400 to illustrate how positioning of the given portion changes upon rotation(s). This blue hologram that was observed in the imaged HRF sample is a volume hologram that was characterized to be primary resulting from diffracted light of the m=+1 order.

Figure 6A:
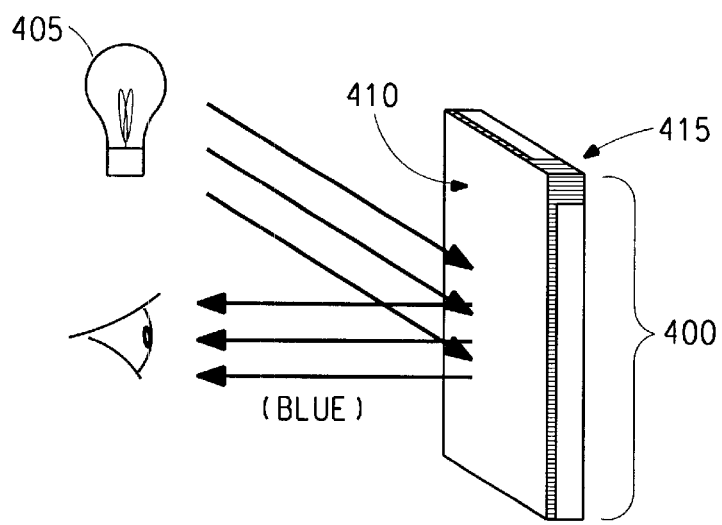
FIGS. 6(a), 6(b) and 6(c) illustrate characteristics of a holographic image as seen by an observer of a holographic optical element (HOE) (400) of this invention upon illumination with a broadband white light source (405) from one side 410 of the HOE, with viewing being normal to the HOE. These figures also illustrate one method for authenticating a HOE of this invention as a security device.
Figure 6B:
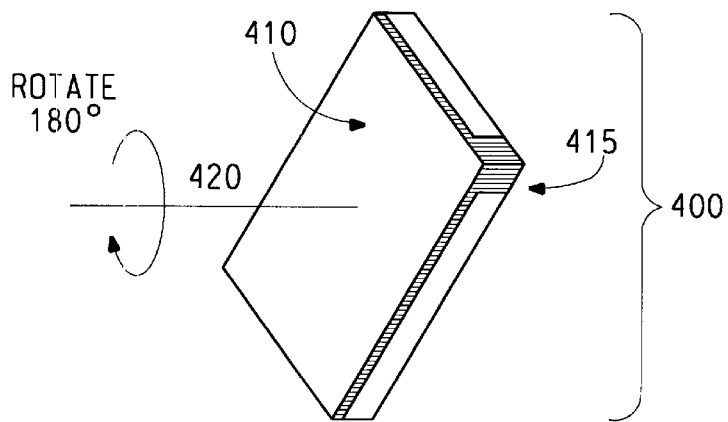

Next, as illustrated in FIG. 6(b), the imaged HRF sample 400 was rotated 180° about an axis 420 perpendicular to 410, the surface of one side, and with the broadband white light source 405 being either fixed or approximately fixed in position, such that the broadband white light after the rotation was incident upon another portion of the surface of the one side of the imaged HRF sample.

Figure 6C:
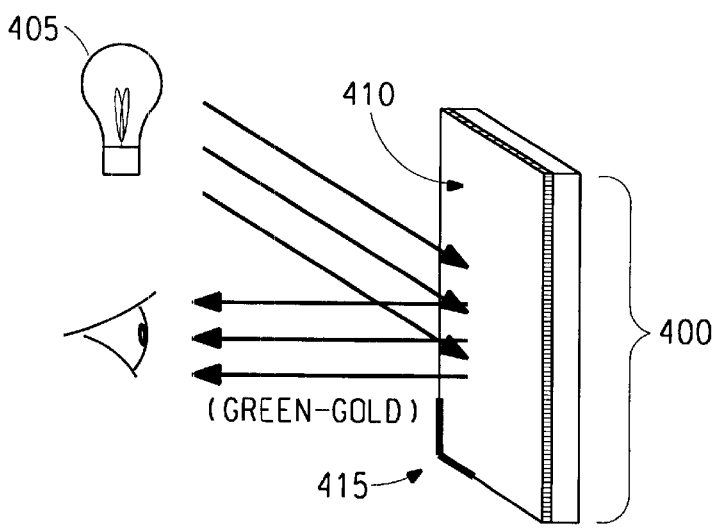

Following the rotation, when illuminated with broadband white light from a broadband white light source 405 that was incident upon another portion of the surface 410 of the one side of the imaged HRF sample 400 as illustrated in FIG. 6(c), the imaged HRF sample 400 displayed a copy of the original surface relief hologram upon illumination at approximately the recording angle. The observed hologram was bright greenish-gold when viewed normal or approximately normal to the plane of the imaged HRF sample (as illustrated in FIG. 6(c). This greenish-gold hologram that was observed in the imaged HRF sample is a volume hologram that was characterized to be complementary resulting from diffracted light of the m=−1 order.

When the same imaged HRF sample 400 was illuminated with white light incident in a direction normal to the surface of the HRF sample, two playback signals could be observed which were similar to the playback observed from the original surface relief hologram. One signal was observed at approximately the original incident exposure angle and was blue. The other signal was observed at an angle similar in magnitude but opposite in sign (plus or minus) to that of the first signal. This signal was greenish-gold in color.

For the m=+1 order in this example, the slant angle ($\phi_1$) and the spacing ($\Lambda_1$) were 10° and 159 nm, respectively.

For the m=−1 order in this example, the slant angle ($\phi_{31\ 1}$) and the spacing ($\Lambda_{31\ 1}$) were −11° and 183 nm, respectively.

The above slant angles and spacings were calculated assuming n=1.515 (which is typical for a photopolymer film of the type utilized).

EXAMPLE 2

The imaged HRF sample used in this Example was prepared in the same way as the volume hologram defined in Example 1, excepting that the pressure-sensitive adhesive applied to the photopolymer after removal from the surface relief hologram was a single-sided transparent adhesive (Mactac IP7000, available from Morgan Adhesives Company, Stow, Ohio) instead of a double-sided adhesive in combination with a black backing film.

Figure 7A:
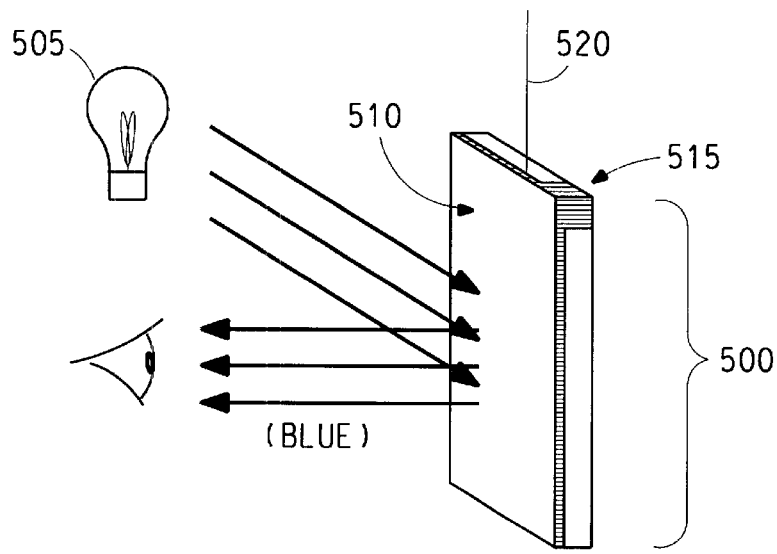
FIGS. 7(a), 7(b) and 7(c) illustrate characteristics of a holographic image as seen by an observer of a HOE (500) of this invention upon illumination with a broadband light source (505) first from one side (510) of the HOE and subsequently from the other side (530) of the HOE. These figures also illustrate another method for authenticating a HOE of this invention as a security device.
Figure 7B:
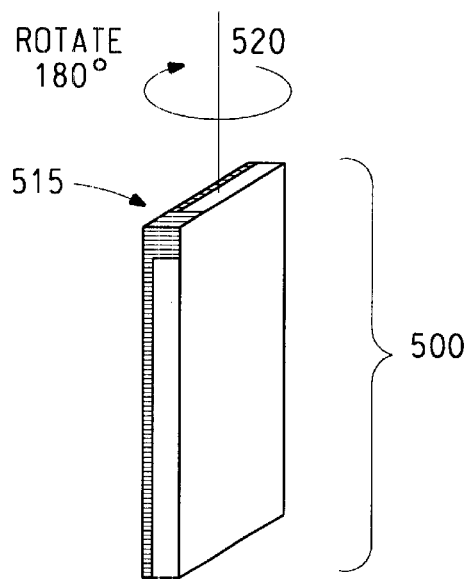
Figure 7C:
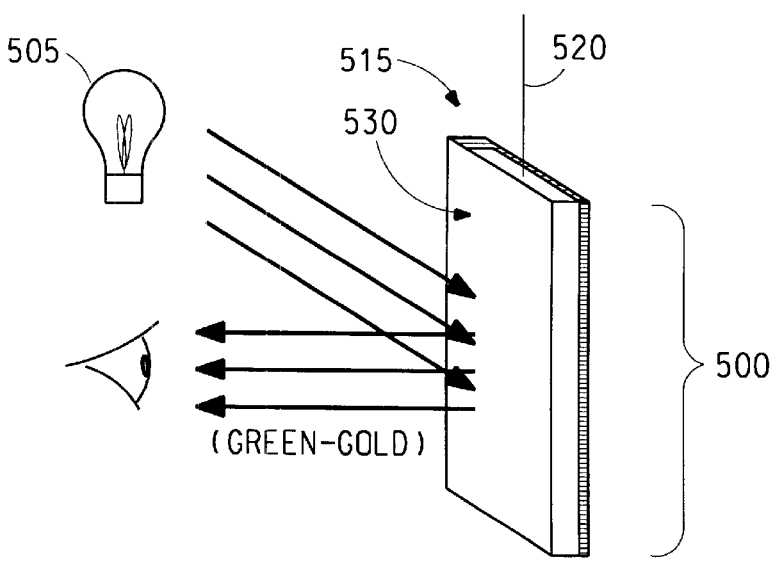

With reference to FIG. 7, the imaged HRF sample is designated as 500 in this example (it was designated 400 in Example 1). As shown in FIG. 7(a), 510 is a first surface of the imaged HRF sample 500, wherein 510 is the side of the imaged HRF from which imaging had been effected earlier. In FIGS. 7(a), 7(b) and 7(c), 515 represents any given portion of the imaged HRF 500 to illustrate how positioning of the given portion changes upon rotation(s). The imaged HRF 500, upon illumination of the first surface 510 with a broadband white light source 505, displayed a copy of the original surface relief hologram upon illumination at approximately the recording angle. The observed hologram was blue when viewed normal or approximately normal to the plane of the imaged HRF sample (as shown schematically in FIG. 7(*a*) without separate layers being shown, where 500 is the imaged HRF, 510 is a first surface (of one side) of the imaged HRF, and 505 is the broadband white light source that was employed). The first surface 510 is the side of the HRF from which imaging using a coherent light source was done, i.e., the side upon which coherent light was incident during imaging, which is the polyester film base side in this example. This blue hologram that was observed in the imaged HRF sample is a volume hologram that was characterized to be primary resulting from diffracted light of the m=+1 order.

Next, as illustrated in FIG. 7(*b*), the imaged HRF sample 500 was rotated 180° about an axis 520 lying in a center plane of the imaged HRF sample 500 and with the broadband white light source 505 being either fixed or approximately fixed in position, such that the broadband white light after the rotation was incident upon a second surface 530 (of the opposite side) of the imaged HRF sample 500.

Following this rotation, when illuminated with broadband white light from a broadband white light source 505 that was incident upon the second surface 530 of the imaged HRF sample 500 as illustrated in FIG. 7(*c*), the imaged HRF sample 500 displayed a copy of the original surface relief hologram upon illumination at approximately the recording angle. The observed hologram was bright greenish-gold when viewed normal or approximately normal to the second surface 530 of the imaged HRF sample (as illustrated in FIG. 7(*c*). This greenish-gold hologram that was observed in the imaged HRF sample is a volume hologram that was characterized to be complementary resulting from diffracted light of the m=−1 order.

COMPARATIVE EXAMPLE 1

The HOE of this example was prepared in the same way as the volume hologram described in Example 1, with the following exceptions:

(A) The master hologram used was the volume hologram prepared in Example 1 and not a surface relief hologram. The side to which the unexposed photopolymer film was laminated was the "polyester base" side of the first hologram; that is, the side opposite the side with the black Cronar® affixed.

(B) The angle of the incident laser beam used for imaging was similar to the angle used in Example 1, but not identical. It was determined by placing the Example 1 hologram in the laser beam in the same position and orientation as in Example 1, and adjusting the incident laser beam angle until the holographic image observed was maximized in efficiency, as determined by an observer. Under this laser illumination, the Example 1 hologram showed only one image playback angle. After exposing and processing as in Example 1, the imaged HRF made in this example was illuminated with broadband white light (in similar manner to that shown in FIGS. 6(*a*), 6(*b*) and 6(*c*) for Example 1). The recorded volume hologram displayed a copy of the original surface relief hologram upon illumination at approximately the recording angle. The observed hologram was blue and was characterized to be the m=+1 primary hologram. When the recorded hologram was rotated 180° (rotation was in same manner as shown in FIG. 6(*b*)) with respect to that used in recording, no hologram was observed.

COMPARATIVE EXAMPLE 2

The original surface relief hologram used as a master in Example 1 was illuminated with laser light of various wavelengths (476 nm, 488 nm, 514 nm, 532 nm, and 647 nm) at the 30° illumination angle. For each wavelength, observed with no other wavelengths present, the holographic image was visible at a playback angle near the film normal. No other playback was observed at any other angle. When the hologram was rotated 180° (rotation in same manner as shown in FIG. 6(*b*)) about an axis perpendicular to the plane of the hologram so that the incident laser light was coming from the opposite side of the film normal to that used for the initial observation, a playback image in the same laser color was again observed near the film normal direction.

EXAMPLE 3

This example illustrates that either the metallized side or non-metallized side of a surface-relief hologram can be used for copying the surface-relief hologram in the present invention.

The two HOEs of this example were prepared in the same way as the volume hologram described in Example 1, with the following exceptions:

(A) The pressure-sensitive adhesive applied to the HOE's after removal of the master hologram was a clear single-sided one (Mactac IP7000, Morgan Adhesives Company, Stow, Ohio) and not a doubled sided one. No black material was applied.

(B) One of the HOE's prepared in this example was exposed after lamination to the metallized side of the surface relief hologram, as in Example 1; the other HOE was exposed after lamination to the other side (non-metallized) of the surface-relief hologram.

Both HOE's were observed in broadband white light as described in Examples 1 and 2, and illustrated in FIGS. 6(*a*), 6(*b*), 6(*c*), 7(*a*), 7(*b*) and 7(*c*). The playback signals described in Examples 1 and 2 were observed for both the HOE created from the metallized side of the original surface relief hologram and for the HOE created from the non-metallized side.

PROPHETIC EXAMPLE 1

The HOE of this example is prepared using the techniques and materials of Example 1, with the following exceptions:

(A) The photopolymer (HRF, source: E. I. du Pont de Nemours, Wilmington, Del.) is responsive to red actinic radiation.

(B) The exposure wavelength is 647 nm.

The resulting HOE is illuminated with broadband white light incident at approximately the recording angle. The observed hologram is red when viewed normal or approximately normal to the plane of the imaged HRF sample.

The white light source remains either fixed or approximately fixed in position, and the HOE is rotated 180° about an axis normal to the film plane, as illustrated in FIG. 6(b). No holographic playback is visually observed. The hologram is then observed through an IR-sensitive device such as a night-vision viewer. An IR image of the original hologram (with depth information inverted) is observed when the white light source is at an angle near the recording angle and the viewer is positioned at an angle normal to the film plane.

The hologram is returned to its original position and, with the white light source remaining either fixed or approximately fixed in position, the HOE is rotated 180° about an axis lying in the film plan and also in the reflection plane, as in FIG. 7(b). No holographic playback is visually observed. The hologram is then observed through an IR-sensitive device such as a night-vision viewer. An IR image of the original hologram is observed when the white light source is at an angle near the recording angle and the viewer is positioned at an angle normal to the film plane.

EXAMPLE 4

This example illustrates depth information concerning the copy of the surface-relief hologram in volume phase material in this invention.

The HOE of this example was prepared in the same way as the volume hologram described in Example 1, with the following exceptions:

(A) The pressure-sensitive adhesive applied to the HOE after removal of the master hologram was a clear single-sided one (Mactac IP7000, Morgan Adhesives Company, Stow, Ohio) and not a doubled sided one. No black material was applied.

(B) The surface relief hologram used as a master for this example was one in which part of the image appeared to exist in the plane of the film and part of it appeared to "float" behind the film; that is, the hologram had obvious "depth". The playback characteristics were otherwise approximately the same as those used in the surface relief hologram of Example 1, so that all recorded slant angles and spacings were also approximately the same as those in the recorded HOE's of Example 1.

The HOE of this example was first observed in broadband white light incident on a surface of one side of the imaged HRF sample, and displayed a copy of the original surface relief hologram upon illumination at approximately the recording angle. The observed hologram was blue when viewed approximately normal to the film plane as illustrated in FIG. 6(a). This hologram was characterized to be primary resulting from the recording of the diffracted light of m=+1 order from the original surface relief hologram.

Next, the imaged HRF sample was rotated 180° about an axis normal to the film plane, as illustrated in FIG. 6(b), to a position as illustrated in FIG. 6(c). The broadband white light source remained approximately fixed in position, so that the hologram was illuminated at approximately the recording angle. The observed hologram was bright greenish-gold and the "deep" part of the original hologram now appeared to float in front of the hologram, so that the image appeared to be like the original image but inverted through the film plane. This hologram was characterized to be a complementary hologram resulting from the recording of the diffracted light of m=−1 order from the original surface relief hologram.

Next, the imaged HRF sample and white light source were returned to their original positions so that the observed playback was again a blue copy of the original surface relief hologram. The HOE was then rotated 180° about an axis lying in the film plan and also in the reflection plane, as in FIG. 7(b), to a position as shown in FIG. 7(c), so that the hologram was illuminated at approximately the recording angle but from the "back". The observed hologram was bright greenish-gold and otherwise appeared the same as the original hologram. This hologram was the same complementary hologram as described above, illuminated in the conjugate sense.

What is claimed is:

1. A method for producing a volume holographic optical element useful as a security device comprising:

(a) placing a photosensitive layer adjacent to a surface-relief hologram in a manner such that the photosensitive layer and the surface-relief hologram are in a relationship selected from the group consisting of 1) direct contact and 2) separated by one or more media with each medium having refractive index greater than 1;

(b) exposing the photosensitive layer and the surface-relief hologram to a coherent light beam to record the surface-relief hologram in the photosensitive layer as reflection holograms comprising at least one primary hologram and at least one complementary hologram recorded by light diffracted from the surface-relief hologram; and (c) separating the surface-relief hologram from the imaged photosensitive layer to obtain the volume holographic optical element.

2. The method of claim 1 wherein the method is performed with $n_r$, $\Lambda$, and $\phi$ having values such that each of the relationships below is satisfied:

$$|2n_r \sin(\phi)\cos(\phi)|<1$$

$$450 \; nm \leq 2n_r \Lambda \cos(\phi) \leq 700 \; nm$$

$$|\sin^{-1}\{2n_r \sin(\phi)\cos(\phi)\}| => 5°$$

wherein $n_r$ is the refractive index of the volume holographic optical element, wherein $\Lambda$ represents spacing of the volume holographic optical element, which spacing equals $$(\lambda_c/n_f)\{2+2 \cos(i_c'-\theta_c')\}^{-\frac{1}{2}},$$

wherein $\phi$ represents slant angle of the volume holographic optical element, which slant angle equals $$\sin^{-1}\{[\sin(i_c')+\sin(\theta_c')][2+2 \cos(i_c'-\theta_c')]^{-\frac{1}{2}}\}$$

where:
$i_c'$=incident exposure beam angle in the recording medium=$\sin^{-1}\{\sin(i_c)/n_f\}$
$i_c$=incident exposure beam angle in air (i.e. outside the stack)

$\theta_c'$=diffracted signal beam angle in the recording medium=$\sin^{-1}\{m\,\lambda_c/(n_f d)-\sin(i_c')\}$ $n_f$=refractive index of the recording medium during exposure d=spacing of the surface relief grating $\lambda_c$=wavelength of the exposure beam m=diffraction order of the signal beam and, whereby the at least one complementary hologram produced in the holographic optical element is viewable.

3. The method of claim 1 wherein the photosensitive layer is a photopolymer layer comprising a binder, an ethylenically unsaturated monomer, and a photoinitiator or photoinitiator system.

4. The method of claim 1 wherein the placing step is performed by placing the photosensitive layer in direct contact with the surface-relief hologram.

5. The method of claim 1 wherein the placing step is performed by separating the photosensitive layer from the surface-relief hologram by one or more media with each medium having refractive index greater than 1.

6. A holographic optical element made in accordance with the method of claim 1.

7. The holographic optical element of claim 6 comprising at least one primary hologram recorded in the photosensitive layer by light diffracted from the surface-relief hologram having a diffraction order $m_1$ that is a positive integer and at least one complementary hologram recorded in the photosensitive layer by light diffracted from the surface-relief hologram having a diffraction order $m_2$ that is a negative or positive integer with the proviso that $m_2$ is not equal to $m_1$.

8. The holographic optical element of claim 7 wherein the at least one primary hologram has a diffraction order $m_1$ that is a positive odd integer and the at least one complementary hologram has a diffraction order $m_2$ that is a negative odd integer.

9. The holographic optical element of claim 8 wherein $m_1$ is +1 and $m_2$ is −1.

10. A method for establishing the authenticity of a holographic optical element comprising the steps of:

(a) illuminating the holographic optical element with white light at an angle $\theta$ measured with respect to a normal line to a surface of the holographic optical element and simultaneously viewing the holographic optical element along the normal line to thereby see a holographic image having a first color, wherein $|\theta|$ is in the range of 15 degrees to 55 degrees;

(b) illuminating the holographic optical element with white light at an angle $\delta=-\theta\pm15°$ measured with respect to a normal line to a surface of the holographic optical element and simultaneously viewing the holographic optical element along the normal line to ascertain if a holographic image is observed having a second color that is characteristic of a wavelength that is longer than that for the first color; and (c) establishing the holographic optical element to be authentic only if a holographic image of the first color is observed in step (a) and a holographic image of the second color is observed in step (b).

11. The method of claim 10 wherein the holographic image of the holographic optical element is characterized as having depth and wherein the holographic image observed in step (b) has an inverted appearance with respect to the holographic image observed in step (a).

12. A method for establishing the authenticity of a holographic optical element having a first surface, a second surface opposite the first surface, and a center plane that is parallel to at least one of the first and second surfaces and is located inside the holographic optical element such that equal portions of the holographic optical element lie on either side of the center plane, comprising the steps of:

(a) illuminating the first surface of the holographic optical element with white light at an angle $\theta$ measured with respect to a normal line to the center plane of the holographic optical element and simultaneously viewing the first surface of the holographic optical element along the normal line to thereby see a holographic image having a first color, wherein $|\theta|$ is in the range of 15 to 55 degrees (°);

(b) rotating the holographic optical element 180° about an axis in the center plane of the holographic optical element with continued illumination such that illumination from step (a) is now incident upon the second surface, and simultaneously viewing the second surface of the holographic optical element along the normal line to ascertain if a holographic image is observed having a second color that is characteristic of a wavelength that is longer than that for the first color; and (c) establishing the holographic optical element to be authentic only if a holographic image of the first color is observed in step (a) and a holographic image of the second color is observed in step (b).

* * * * *